United States Patent [19]

Miyatake

[11] Patent Number: 5,327,270
[45] Date of Patent: Jul. 5, 1994

[54] POLARIZING BEAM SPLITTER APPARATUS AND LIGHT VALVE IMAGE PROJECTION SYSTEM

[75] Inventor: Yoshito Miyatake, Neyagawa, Japan

[73] Assignee: Matsushita Electric Industrial Co., Ltd., Osaka, Japan

[21] Appl. No.: 126,004

[22] Filed: Sep. 24, 1993

Related U.S. Application Data

[63] Continuation of Ser. No. 830,751, Feb. 7, 1992, abandoned, which is a continuation-in-part of Ser. No. 497,251, Mar. 22, 1990, abandoned.

[30] Foreign Application Priority Data

Mar. 23, 1989 [JP] Japan .................. 1-70880

[51] Int. Cl.$^5$ ............ G02B 5/30; G02B 27/28; G02F 1/1335; G03B 21/00
[52] U.S. Cl. ..................... 359/63; 353/31; 359/256; 359/494; 359/495; 359/499
[58] Field of Search ........ 350/394, 397, 404; 353/31; 359/73, 256, 494, 495, 497, 499, 63, 65

[56] References Cited

U.S. PATENT DOCUMENTS

| | | | |
|---|---|---|---|
| 2,958,258 | 11/1960 | Kelly | 350/394 |
| 3,346,319 | 10/1967 | Billings | 350/394 |
| 3,497,283 | 2/1970 | Law . | |
| 3,508,809 | 4/1970 | Wilder et al. | 350/394 |
| 3,512,868 | 5/1970 | Gorkiewicz et al. | 350/394 |
| 3,614,195 | 10/1971 | Vollmer | 359/499 |
| 3,644,018 | 2/1972 | Dasold | 359/499 |
| 3,753,608 | 8/1973 | Bernal . | |
| 4,124,278 | 11/1978 | Grinberg et al. | 359/73 |
| 4,191,456 | 3/1980 | Hong et al. | 353/31 |
| 4,343,535 | 8/1982 | Bleha, Jr. | 359/73 |
| 4,464,018 | 8/1984 | Gagnon . | |
| 4,464,019 | 8/1984 | Gagnon . | |
| 4,554,237 | 10/1985 | Gagnon . | |
| 4,634,232 | 1/1987 | Tateoka | 350/394 |
| 4,723,077 | 2/1988 | Wu . | |
| 4,796,978 | 1/1989 | Tanaka et al. | 350/397 |
| 4,836,649 | 6/1989 | Ledebuhr et al. | 353/31 |
| 4,935,758 | 6/1990 | Miyatake et al. | 350/397 |
| 4,936,658 | 6/1990 | Tanaka et al. | 350/397 |
| 4,995,702 | 2/1991 | Aruga | 359/93 |
| 5,042,921 | 8/1991 | Sato et al. | 359/73 |
| 5,067,799 | 11/1991 | Gold et al. | 359/495 |
| 5,073,830 | 12/1991 | Loucks | 359/495 |

FOREIGN PATENT DOCUMENTS 61-13885  1/1986  Japan .

OTHER PUBLICATIONS

Patent Abstracts of Japan, vol. 10, No. 158 (E-409) [2214], Jun. 6, 1986; & JP-A-61 013 885 (Sony K.K.) Jan. 22, 1986.

*Primary Examiner*—Martin Lerner
*Attorney, Agent, or Firm*—Wenderoth, Lind & Ponack

[57] ABSTRACT

A polarizing beam splitter apparatus of a light valve image projection system includes a polarizing beam splitter commonly usable as a polarizer and an analyzer, and a quarter wave plate in combination. In the polarizing beam splitter apparatus, a quarter wave plate is arranged in a light path along which a light passes out from and passes back again to the polarizing beam splitter in such a manner that either a fast axis or a slow axis of the quarter wave plate is perpendicular to a plane containing both a first optical axis and a second optical axis of the polarizing beam splitter, so that the angular range of a light to be used can be increased. In the light valve image projection system, a light outputted from a light source is incident through a polarizing beam splitter apparatus to a light valve, and an effective component of the light reflected from the light valve is projected through the polarizing beam splitter apparatus and a projection lens on a projection screen. The polarizing beam splitter apparatus is high in polarization efficiency even if the range of incident angle of a light to be used is large, so that a projected image highly improved in contrast and brightness can be obtained.

14 Claims, 9 Drawing Sheets

POLARIZING BEAM SPLITTER APPARATUS AND LIGHT VALVE IMAGE PROJECTION SYSTEM

This application is a continuation of now abandoned application, Ser. No. 07/830,751, filed Feb. 7, 1992, which is a continuation-in-part of now abandoned application, Ser. No. 07/497,251 filed on Mar. 22, 1990.

BACKGROUND OF THE INVENTION

1. Field of the Invention

This invention relates to a polarizing beam splitter apparatus commonly usable as a polarizer and an analyzer and a light valve image projection system using the same in which an optical image formed on a reflection light valve is irradiated by an illuminating light to be projected on a projection screen through a projection lens.

2. Description of the Prior Art

As a method to obtain a large projection screen image, projection display system using a liquid crystal panel as the light valve is well-known conventionally. In this system, an optical image corresponding to an image signal is formed on a liquid crystal panel and the optical image thus formed thereon is irradiated by an illuminating light and enlarged and projected on a projection screen by a projection lens. A projection display system in which a reflection liquid crystal panel is used for the light valve is disclosed in, for example, Japanese Pat. Appln. of Laid-Open No. 61-13885 and U.S. Pat. No. 4,464,018. The optical system of this projection display system consists of a light source for irradiating an approximately parallel light, a polarizing beam splitter to be commonly used as a polarizer and an analyzer, a reflection liquid crystal panel and a projection lens. A light outputted from the light source is separated by the polarizing beam splitter into an S polarized component to be reflected and a P polarized component to be passed straight. The S polarized light component thus obtained is incident to the liquid crystal panel and the reflection light therefrom is sent to the polarizing beam splitter again. The P polarized component contained in the reflection light passes straight through the polarizing beam splitter to enter into the projection lens. The reflection liquid crystal panel uses the birefringence of a liquid crystal and has a reflection electrode for reflecting light. The reflection liquid crystal panel is not substantially birefringent when a voltage is not applied to the liquid crystal layer, but when a voltage is applied thereto, birefringent characteristics are realized. If a linearly polarized light having a pre-determined polarization direction is directed into the liquid crystal panel, the polarization state of light reflected therefrom can be controlled by the voltage that is applied thereto. As such an optical image can be formed on the liquid crystal panel as the result of the change in birefringence and the optical image thus formed can be enlarged and projected on a projection screen by the projection lens.

In the reflection liquid crystal panel, a switching element can be arranged under the pixel electrode, so that a high density arrangement is made possible by reducing the pixel pitch without the need to make the switching element small, thus being advantageously capable of obtaining a projected image of a higher resolution on a projection screen than in the case of using a transmission liquid crystal panel.

With the light valve image projection system as such, however, if the angle between the light incident to the polarizing beam splitter and the incident optical axis is increased, a problem may arise in that the contrast of a projected image is reduced. Therefore, a xenon lamp, which has a small light radiator and is high in luminance, has been used in many cases. In this case, however, it has been pointed out that the xenon lamp is low in efficiency and short in service life. From the viewpoint of the efficiency and service life of a lamp to be used, the use of a metal halide lamp can be considered, but such is a larger light radiator as compared with the xenon lamp, so that the angle between the incident light to the polarizing beam splitter and the incident optical axis is increased, the result being that the brightness and the contrast of a projected image are difficult to coexist.

SUMMARY OF THE INVENTION

An object of this invention is to provide a polarizing beam splitter apparatus in which a light beam which is considerably deviated from the parallel condition can be used. Another object of this invention is to provide a light valve image projection system capable of obtaining a projected image which is improved in contrast and brightness.

A polarizing beam splitter apparatus of this invention comprises a polarizing beam splitter commonly usable as a polarizer and an analyzer, and a quarter wave plate. The polarizing beam splitter comprises a pair of prisms, and multi-layers of thin films interposed between the pair of prisms. The polarizing beam splitter has four facets, a first optical axis and a second optical axis. Two of the four facets are parallel to each other and perpendicular to the first optical axis, and the remaining two facets are parallel to each other and perpendicular to the second optical axis. The quarter wave plate is arranged in the light path along which a light beam from the light source passes from and returns to the polarizing beam splitter so as to make either a fast axis or a slow axis thereof perpendicular to the plane containing both the first optical axis and the second optical axis of the polarizing beam splitter.

In addition, a light valve image projection system of this invention comprises a light source, a polarizing beam splitter, a reflection light valve for modulating the polarization state of a light beam and reflecting the light beam thus modulated, a quarter wave plate, and a projection lens. An output light beam from the light source is entered through the polarizing beam splitter along the first optical axis into the light valve, and an effective component contained in the light beam reflected from the light valve is projected through the polarizing beam splitter and the projection lens along the second optical axis onto a projection screen, in which the quarter wave plate is arranged in the light path between the polarizing beam splitter and the light valve in such a manner that either a fast axis or a slow axis of the quarter wave plate is perpendicular to the plane containing both the first optical axis and the second optical axis of the polarizing beam splitter.

With the above-mentioned arrangement, when a light beam is obliquely directed into the polarizing beam splitter, the light beam outputted from the polarizing beam splitter acting as a polarizer becomes a linearly polarized light beam having a direction of polarization tilted from the ideal direction. However, when the linearly polarized light beam is passed through the quarter wave plate two times, it becomes a linearly polarized light beam having a direction of polarization tilted to the opposite direction therefrom, which is a direction of polarization that the polarizing beam splitter is usable as an analyzer. Thus, the angular range of a light beam to be used for the polarizing beam splitter apparatus can be widened. In addition, by using this polarizing beam splitter apparatus, if the angular range of a light beam incident to the polarizing beam splitter is increased for increasing the brightness of a projected image, no reduction in the contrast of a projected image results, thus providing a light valve image projection system which is improved in contrast and brightness.

Features and effects of this invention will be further appreciated by referring to the following detailed description of the preferred embodiments of this invention taken in conjunction with the drawings attached.

DESCRIPTION OF THE PREFERRED EMBODIMENTS

Figure 1:
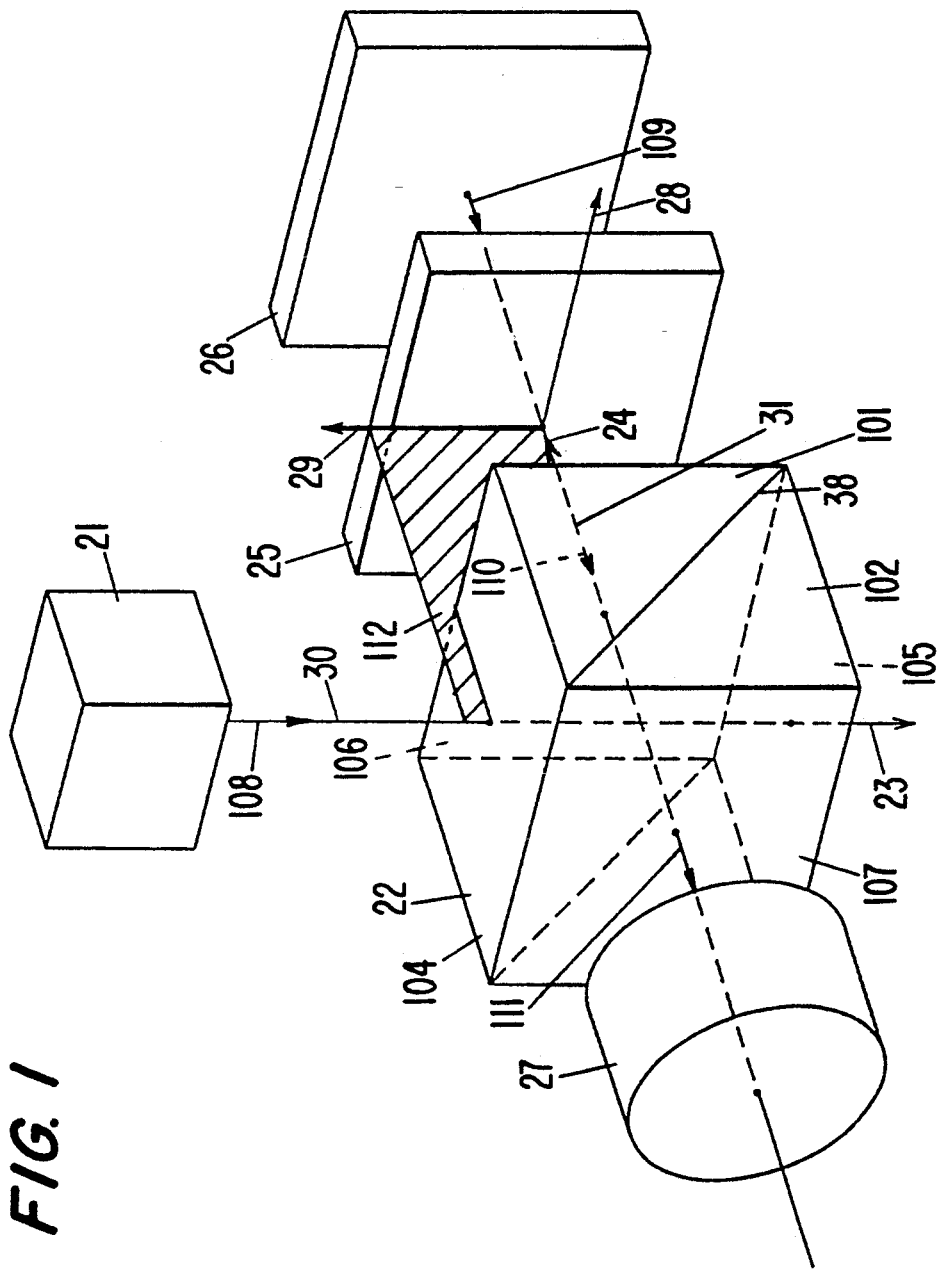
FIG. 1 is a perspective view showing an arrangement of a light valve image projection system according to one embodiment of this invention.
Figure 2:
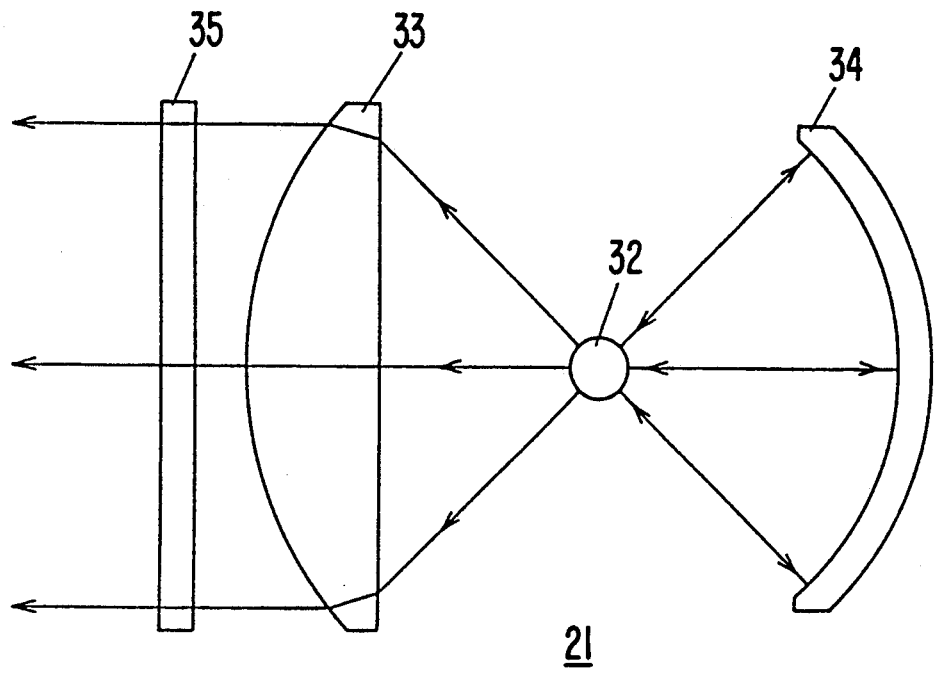
FIG. 2 schematically shows an arrangement of a light source shown in FIG. 1.

FIG. 1 shows an arrangement of an optical system according to one embodiment of this invention. A polarizing beam splitter apparatus comprises a polarizing beam splitter 22 and a quarter wave plate 25. The polarizing beam splitter 22 comprises a pair of prisms 101 and 102, and a polarizing beam-splitting layer 38 interposed between the pair of prisms 101 and 102. The polarizing beam splitter has four facets 104, 105, 106 and 107. Among the four facets, two facets 104 and 105 are parallel to each other and perpendicular to the first optical axis 30, and the remaining two facets 106 and 107 are parallel to each other and perpendicular to the second optical axis 31. The quarter wave plate 25 has two facets each of which is perpendicular to the second optical axis 31, and has a fast axis 28 and a slow axis 29 both of which are perpendicular to each other and perpendicular to the second optical axis 31. As shown in FIG. 2, a light source 21 comprises a lamp 32, a condenser lens 33, a concave mirror 34 and a heat absorbing filter 35. Light irradiated from the lamp 32 is converted through the condenser lens 33 and the concave mirror 34 into an approximately parallel light beams, which is then passed through the heat absorbing filter 35 and output therefrom. The light 108 thus output from the light source 21 is entered along the first optical axis 30 into the polarizing beam splitter 22 for separating it at the multi-layers 103 into a P polarized component 23 to be passed straight and an S polarized component 24 to be reflected, along the second optical axis 31 of which, the S polarized component 24 passes through the quarter wave plate 25 to a liquid crystal panel 26 which is perpendicular to the second optical axis 31. The light 109 reflected from the liquid crystal panel 26 passes through the quarter wave plate 25 to enter into the polarizing beam splitter 22. Out of the light 110 thus entered, a light 111 to be passed straight through the polarizing beam splitter arrives on a projection screen after passing through the projection lens 27. An optical axis of the projection lens 27 is either the same as or parallel to the second optical axis 31. The quarter wave plate 25 is arranged so that either the fast axis 28 or the slow axis 29 thereof is perpendicular to the plane 112 containing both the first incident optical axis 30 and the second optical axis 31 of the polarizing beam splitter 22.

The liquid crystal panel 26 is liquid crystal panel of 45° twisted mode, and each pixel thereof has a reflection electrode. Also, switching elements for active matrix drive are arranged under the reflection electrode. Accordingly, a high density system is made possible by reducing the pixel pitch without the need of reducing the size of each switching element, resulting in a projected image with an improved resolution. The pixel pitch is such as to be 30 $\mu$m lengthwise and 35 $\mu$m crosswise. When not applying a voltage, the liquid crystal layer becomes isotropic, and on the other hand, when applying a voltage, it becomes birefringent. As a result, if a linearly polarized light of a predetermined polarization direction is incident to the liquid crystal panel 26, the polarization state of a light reflected from each pixel varies depending on the voltage applied to each pixel.

The quarter wave plate 25 makes it possible that the phase difference between the fast axis 28 (the polarization direction to minimize refractive index, or to maximize the phase velocity) and the slow axis 29 (the polarization direction to maximize refractive index, or to minimize the phase velocity) is substantially a quarter wavelength with respect to the main wavelength of a light beam to be outputted from the projection lens 27. The phase difference therebetween being substantially a quarter wavelength means that when n is a positive integer, the phase difference therebetween is $(2n-1)/4$ times the wavelength. The light passes through the quarter wave plate 25 two times, which means that it acts to operate as a half wave plate substantially. The half wave plate is featured as follows: (1) If an incident light is a linearly polarized light, the light to be outputted also becomes linearly polarized; and (2) the direction dividing the angle between the direction of polarization of an incident linearly polarized light and the direction of polarization of the outputted linearly polarized light into two equal parts coincides with either the fast axis 28 or slow axis 29.

Hereinbelow, the principle of a light valve image projection system of this invention will be explained and compared with the conventional art.

Figure 3:
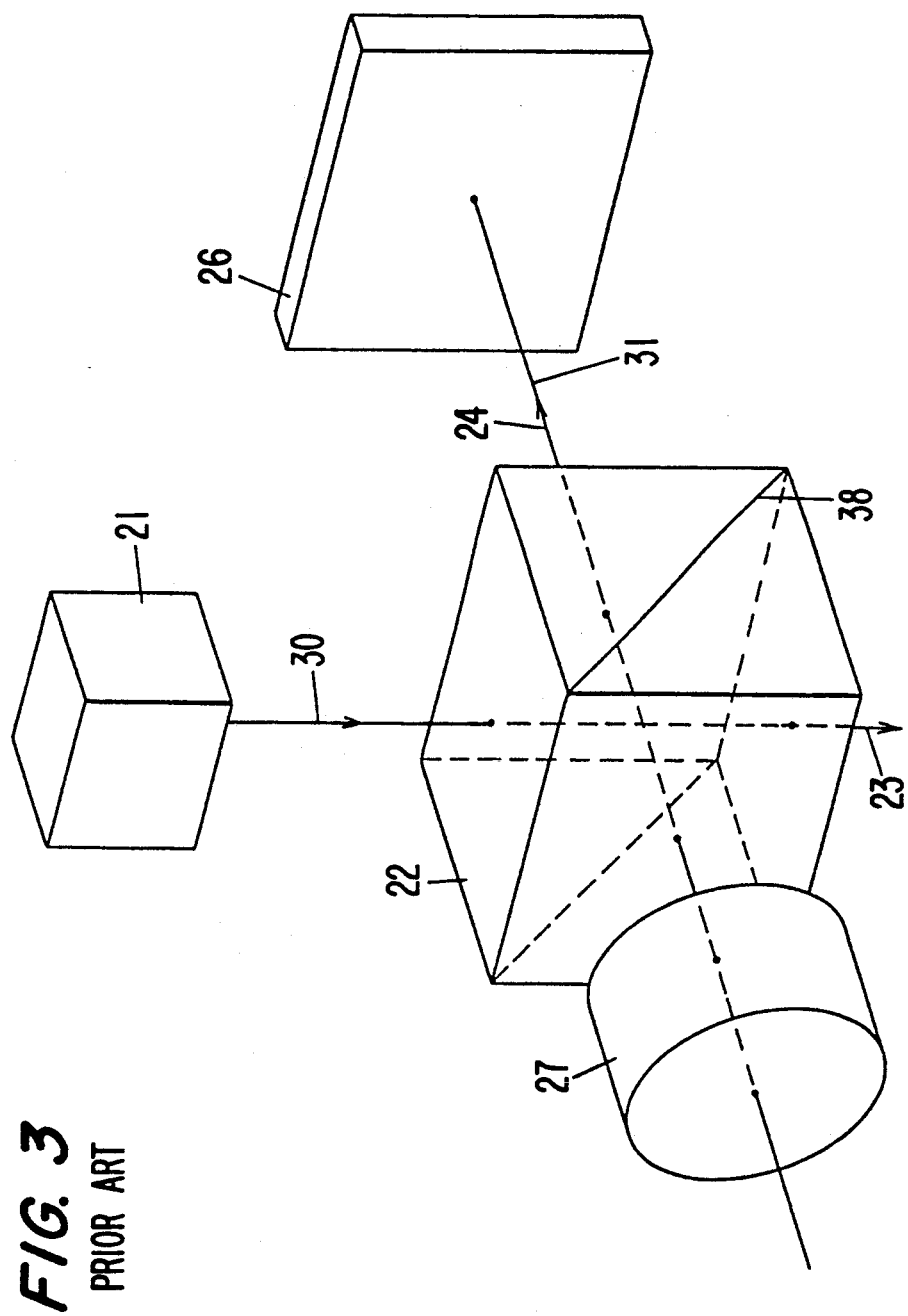
FIG. 3 is a perspective view showing an arrangement of a conventional light valve image projection system.
Figure 4:
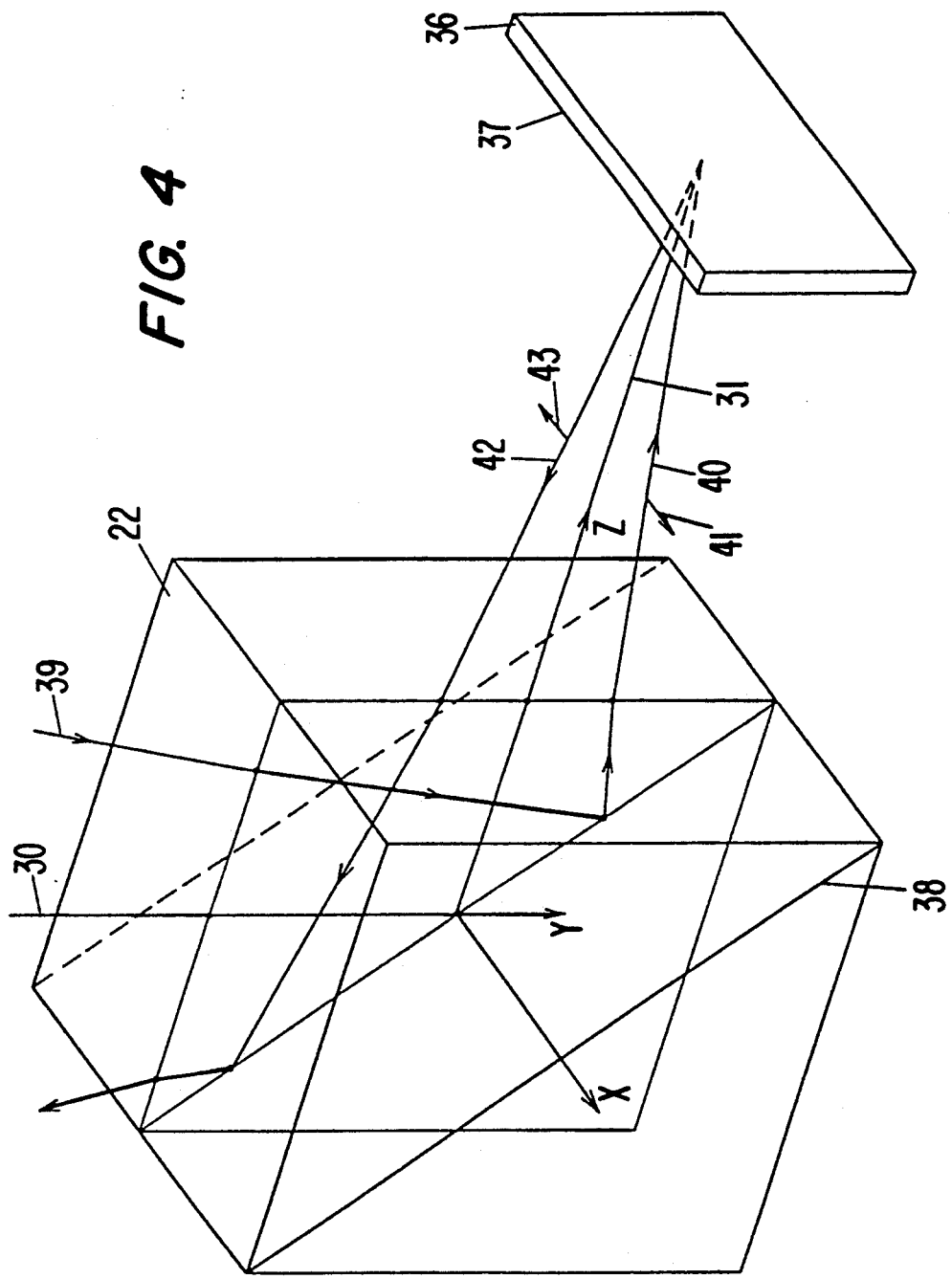
FIGS. 4 and 5 are illustrations for explaining the operation of a polarizing beam splitter shown in FIG. 1.

FIG. 3 shows an arrangement of a conventional light valve image projection system. It differs from the system shown in FIG. 1 in that the quarter wave plate 25 is not introduced. In this case, as shown in FIG. 4, a system in which a plane mirror 36 is introduced instead of the liquid crystal panel 26 shown in FIG. 3 is considered. The plane mirror 36 operates to act equivalently to the case in which the liquid crystal panel 26 is not birefringent. Also, suppose that a reflection plane 37 of the plane mirror 36 is perpendicular to the second optical axis 31 of the polarizing beam splitter 22, and a reflection plane 38 of the polarizing beam splitter 22 reflects the S polarized component and passes the P polarized component straight therethrough. That is, suppose that the plane mirror 36 has ideal characteristics. Suppose further that the first optical axis 30 and the second optical axis 31 of the polarizing beam splitter 22 lie along a Y-axis and Z-axis, respectively, and that a direction perpendicular to the Y- and Z-axes is an X-axis.

FIG. 4 shows the light advancement when an unpolarized incident light beam 39 is within the YZ-plane and the incident direction is not parallel to the Y-axis. The polarization directions of the S and P polarized components are determined as follows. When a light beam strikes at any incident angle, the incident light beam, the reflected light beam, the refracted light beam and the normal of the surface are contained in a plane. This plane is called "a plane of incidence". The S polarized component is perpendicular to the plane of incidence and the P polarized component is parallel to the plane of incidence. A light beam 40 reflected from the polarizing beam splitter 22 is a linearly polarized light whose polarization direction 41 is parallel to the X-axis, because the plane of incidence for the light beam 40 is parallel to the YZ-plane, and the light beam 42 reflected from the plane mirror 36 also has a polarization direction 43 parallel to the X-axis, so that the light beam 42 cannot pass straight through the polarizing beam splitter 22. With the system shown in FIG. 4, the case in which the quarter wave plate 25 is arranged in the light path between the plane mirror 36 and the polarizing beam splitter 22 so as to direct the fast axis 28 thereof to the direction of the X-axis will be considered. In this case, a linearly polarized light whose direction of polarization is parallel to the fast axis 28 is inputted to the quarter wave plate 25, so that the polarization state thereof does not change before and after passing through the quarter wave plate 25, which means that the quarter wave plate 25 contributes nothing to the operation.

Figure 5:
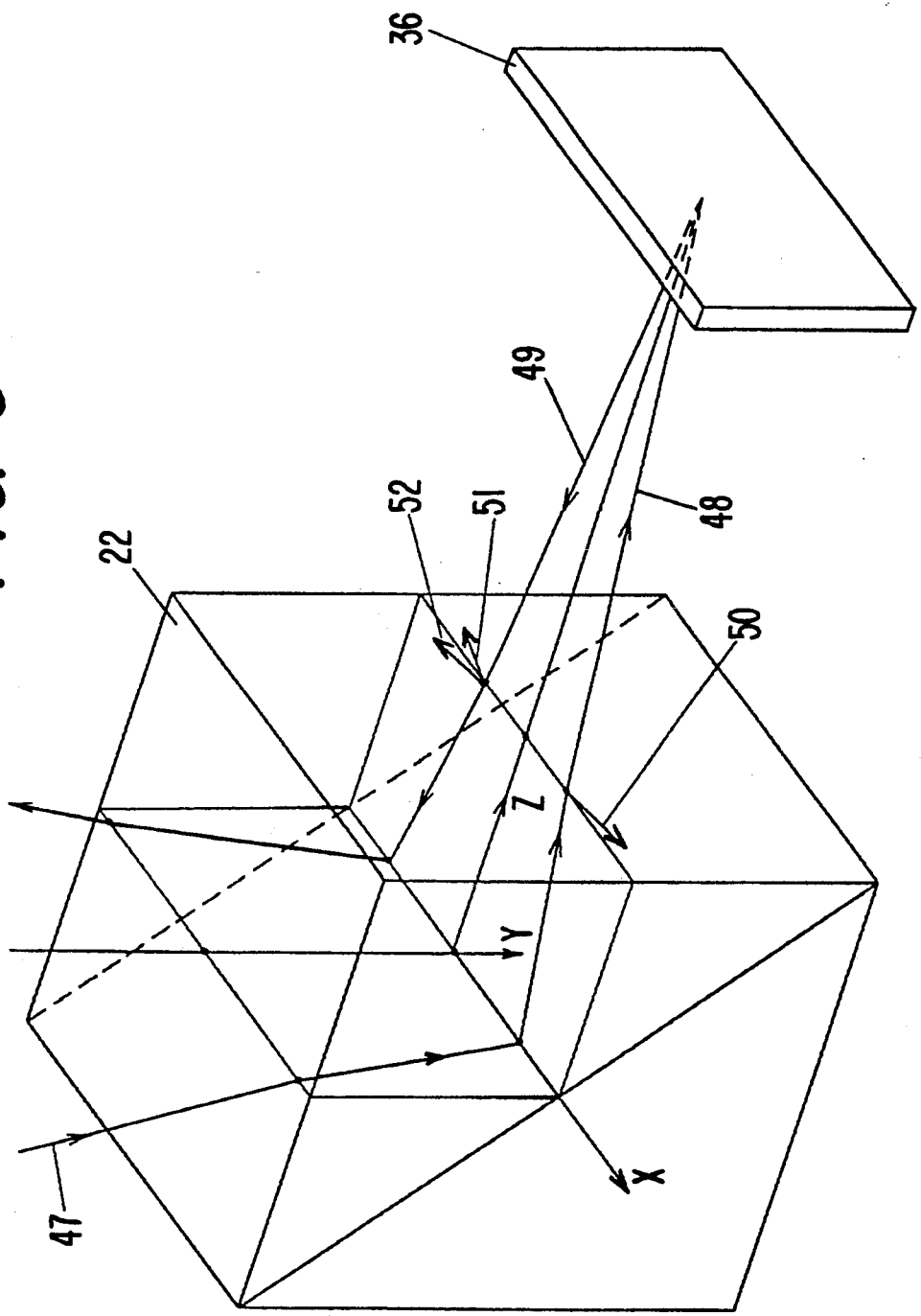

Next, as shown in FIG. 5, the case in which an unpolarized incident light beam 47 is within the XY-plane and the incident direction thereof is not parallel to the Y-axis will be considered. As the incident light beam 47 is within the XY-plane, the incident light beam 48 to and the reflection light beam 49 from the plane mirror 36 both are within the XZ-plane, so that the direction dividing the angle between the direction of the light beam 48 and the direction of the light beam 49 into two equal parts is parallel to the Z-axis However, S polarization directions of the polarizing beam splitter 22 for the lights 48 and 49 are not parallel to the XZ-plane because the plane of incidence for each of the light beams 48 and 49 is not parallel to the XZ-plane.

Figure 6:
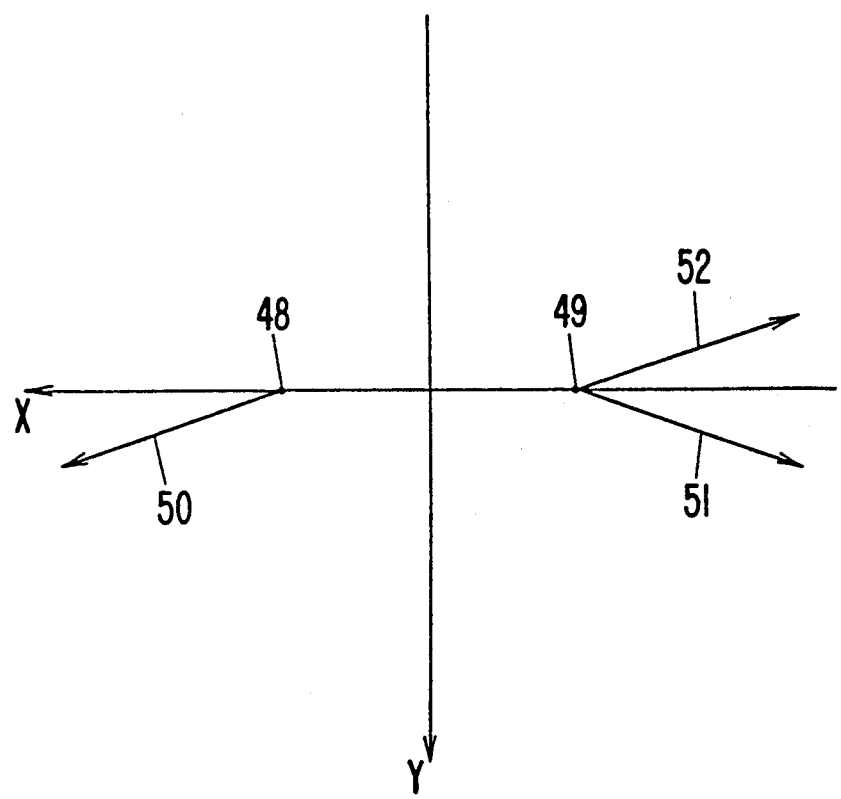
FIGS. 6, 7 and 8 are illustrations for explaining the operation of a quarter wave plate shown in FIG. 1.

FIG. 6 shows projections of S polarization directions 50 and 51 of the polarizing beam splitter 22 for the lights 48 and 49 onto the XY-plane In FIG. 6, referring to the S polarization direction with respect to the X-axis, the light beam 48 rotates counterclockwise and the light beam 49 rotates clockwise by the same angle. As the polarizing beam splitter 22 serves to act as a polarizer, the light beam 48 becomes linearly polarized light having the direction shown in FIG. 6, but the plane mirror 36 does not change the polarization state of a light beam before and after reflection therefrom, so that the light beam 49 becomes a linearly polarized light having the direction 52 as shown in FIG. 6. Since the polarization direction 52 of the light beam 49 is not identical to the S polarization direction 51 of the polarizing beam splitter 22 for the light beam 49, a part of the light beam 49 passes straight through the polarizing beam splitter 22. As the angle between the first optical axis 30 and the incident light 47 increases, the component passing straight through the polarizing beam splitter 22 is rapidly increased. This is the reason why with the conventional system as shown in FIG. 3, if the angular range of an incident light is increased, then the contrast of a projected image will be reduced.

Figure 7:
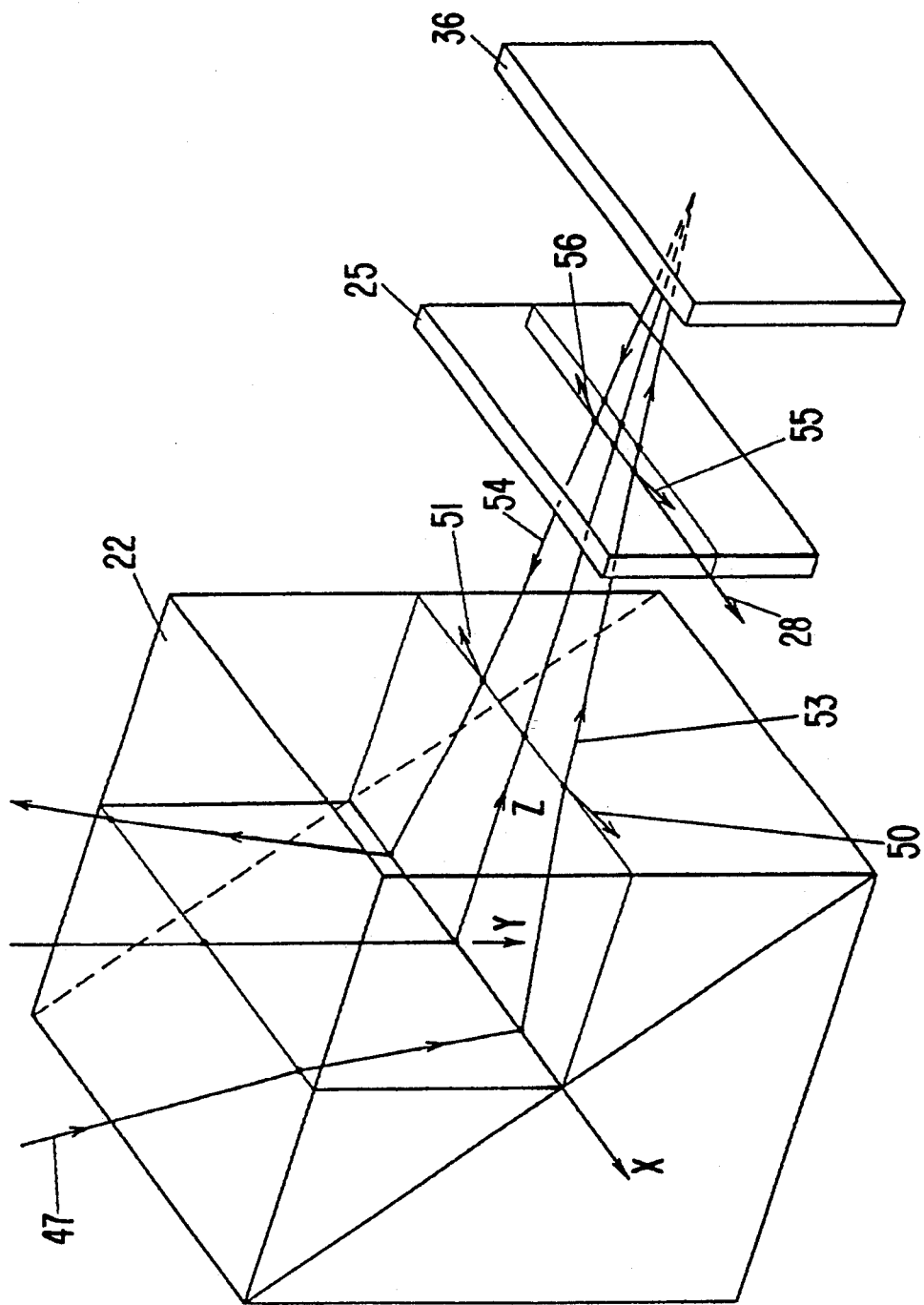
Figure 8:
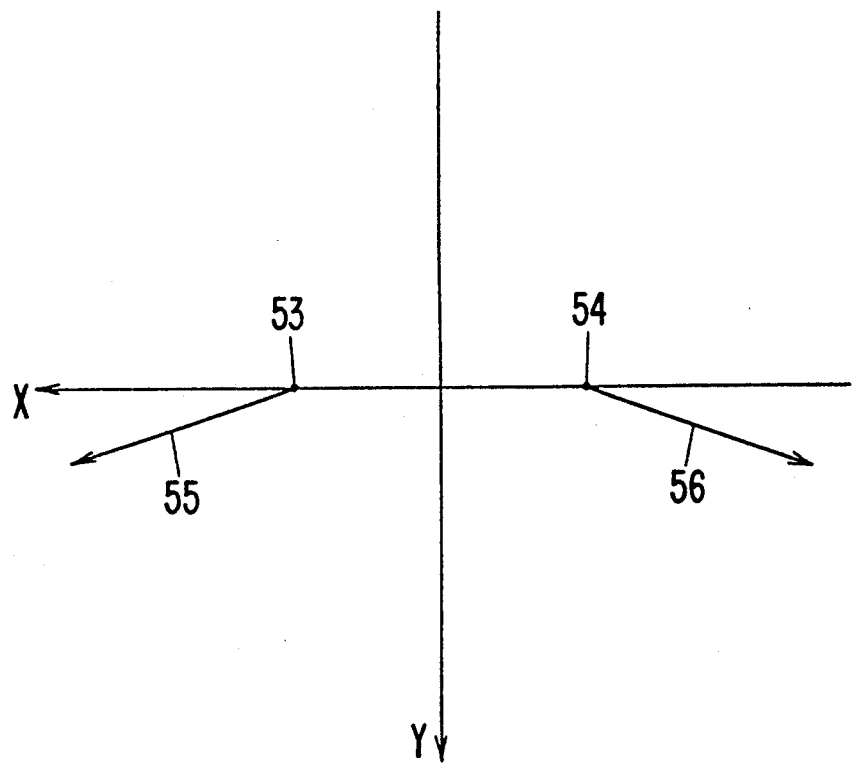

As shown in FIG. 7, the case is now considered in which the quarter wave plate 25 is arranged in the light path between the polarizing beam splitter 22 and the plane mirror 36 so as to direct the fast axis 28 thereof to the X-axis direction. Surface reflection of the quarter wave plate 25 is neglected for simplification. In FIG. 7, a linearly polarized light beam 53 incident to the quarter wave plate 25 passes through the same two times via the plane mirror 36 to produce a light beam 54. The light beam 54 thus produced also is linearly polarized light, and the direction dividing the angle between the polarization direction 55 of the light beam 53 and the polarization direction 56 of the light beam 54 into two equal parts is identical to the fast axis 28. FIG. 8 shows projections of polarization directions 55 and 56 of the light beams 53 and 54 onto the XY-plane. Referring to FIG. 6, the polarization direction 56 of the light beam 54 is identical to the S polarization direction of the polarizing beam splitter 22 for the light beam 54. As a result, no light component that passes straight through the polarizing beam splitter 22 exists in the light beam 54.

From the above description, it is revealed that the combined use of the polarizing beam splitter 22, commonly usable as a polarizer and an analyzer, with the quarter wave plate 25 makes it possible that even if the angular range of incident light is increased, the polarization efficiency of the polarizing beam splitter 22 is not reduced. Also, the light valve image projection system shown in FIG. 1 does not reduce the contrast of a projected image, even when the angular range of incident light is increased. If the angular range of incident light to the polarizing beam splitter 22 is increased, then a projected image will become high in brightness. In addition, a metal halide lamp can be used as the light source. Compared with a halogen lamp or a xenon lamp, the metal halide lamp is advantageously higher in lamp efficiency and longer in service life, and thus is desirable member for used in a light valve image projection system. However, a light radiator of the metal halide lamp is larger than the light radiators of the halogen lamp and xenon lamp. The angular range of the output light from the light source 21 shown in FIG. 2 is determined by the focal length of the condenser lens 33 and the size of the light radiator in the lamp 32. As the size of the light radiator increases without changing the focal length of the condenser lens 33, the angular range of the output light to the polarizing beam splitter 22 becomes larger. Since the polarizing beam splitter apparatus of this invention can use a light source having a larger angular range of incident light without decreasing the contrast of the projected image, the metal halide lamp can be used as the light source.

Descriptions have been made above on a polarizing beam splitter apparatus and a light valve image projection system using the same according to one embodiment of this invention. However, the scope of this invention is not to be limited thereby. The feature of this invention is the combined use of the polarizing beam splitter 22 with the quarter wave plate 25, and many modifications can be considered as follows:

Though the surface reflection of the quarter wave plate 25 was neglected in the above description, in a practical case, a light beam reflected from the surface of the quarter wave plate 25 on the side of the polarizing beam splitter 22 after being outputted from the polarizing beam splitter 22 reduces the contrast of a projected image because the direction of polarization is not compensated. Such a surface reflection can be eliminated by adhering the quarter wave plate 25 securely to the polarizing beam splitter 22 using, for example, a transparent adhesive, resulting in further improvement in contrast.

In the arrangement shown in FIG. 1, if a polarizing plate through which the S polarized component can be passed is arranged in the light path between the light source 21 and the polarizing beam splitter 22, and another polarizing plate through which the P polarized component can be passed is arranged in the light path between the polarizing beam splitter 22 and the projection lens 27, the contrast of a projected image is still further improved. In this case, even when the polarization efficiency of the polarizing beam splitter 22 is slightly low, if the polarization efficiency of the polarizing plates thus arranged are high, the contrast of a projected image can be improved. Even when either polarizing plate of the two is used, an advantageous effect can be obtained. In this case, if the polarizing plate to be used is securely adhered to the polarizing beam splitter 22 using, for example, a transparent adhesive, the interface with air can be reduced, resulting in an advantageous effect to improve the brightness of a projected image.

Next, another embodiment of a light valve image projection system of this invention will be explained.

Figure 9:
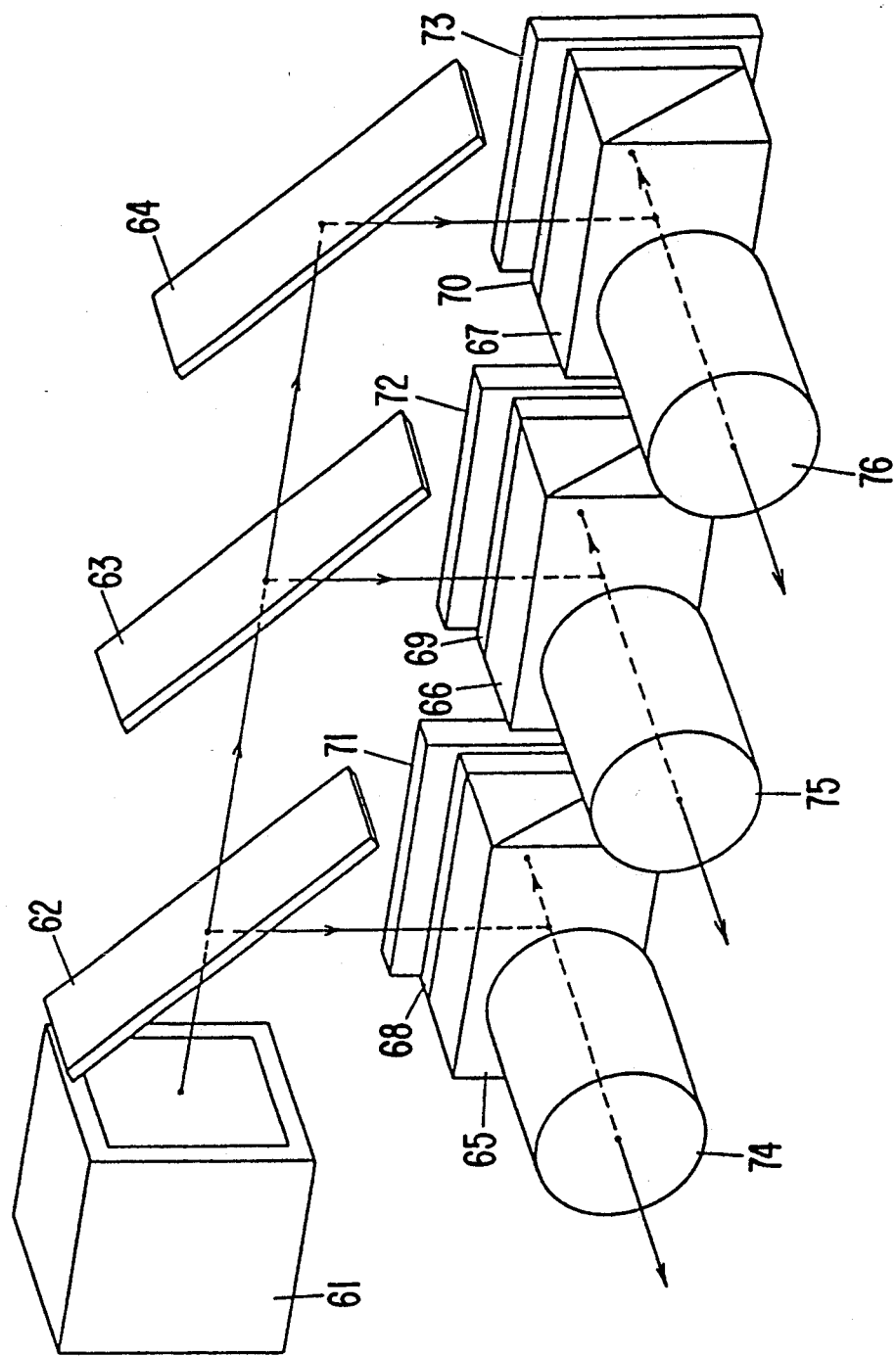
FIG. 9 is a perspective view showing an arrangement of a light valve image projection system according to another embodiment of this invention.

FIG. 9 perspectively shows a light valve image projection system in which three reflection liquid crystal panels shown in FIG. 1 are introduced for color applications (red, green and blue) in order to project a full-color image on a projection screen. In FIG. 9, the reference numeral 61 indicates a light source, 62, 63 and 64 indicate a dichroic mirror, 65, 66 and 67 indicate a polarizing beam splitter, 68, 69 and 70 indicate a quarter wave plate, 71, 72 and 73 indicate a reflection liquid crystal panel, and 74, 75 and 76 indicate a projection lens.

A light outputted from the light source 61 is separated by the dichroic mirrors 62, 63 and 64 into three color light beams, blue, green and red. Each of the three color light beams thus separated is incident to the corresponding one of the polarizing beam splitters 65, 66 and 67 to thereby separate it into the S polarized component to be reflected and the P polarized component to be passed straight therethrough. The S polarized component of each light color is passed through the corresponding one of the quarter wave plates 68, 69 and 70 and sent to the corresponding one of the liquid crystal panels 71, 72 and 73. Out of the reflection light from each of the liquid crystal panels 71, 72 and 73, the P polarized component is passed through the corresponding one of the quarter wave plates 68, 69 and 70, and passed straight through the corresponding one of the polarizing beam splitters 65, 66 and 67 to enter into the corresponding one of the projection lenses 74, 75 and 76. Thus, an enlarged optical image formed on each of the liquid crystal panels 71, 72 and 73 as the result of the change in birefringence is projected by the corresponding one of the projection lenses 74, 75 and 76 on a projection screen.

Similar to the arrangement shown in FIG. 1, each of the quarter wave plates 68, 69 and 70 is arranged so that either a fast axis or a slow axis thereof is perpendicular to the plane containing both the first optical axis and the second optical axis of the corresponding one of the polarizing beam splitters 65, 66 and 67. In addition, each of the quarter wave plates 68, 69 and 70 prevents the reduction in contrast of a projected image caused by light obliquely incident to the corresponding one of the polarizing beam splitters 65, 66 and 67. As a result, even if a metal halide lamp is used for the light source, the brightness and the contrast of a projected image can coexist. In addition, each of the quarter wave plates 68, 69 and 70 can make phase difference of quarter wavelength with respect to the main wavelength of a light outputted from the corresponding one of the projection lenses 74, 75 and 76. What the phase difference closely becomes quarter wavelength is for a specific wavelength, so that if deviated from this specific wavelength, the contrast of a projected image will be reduced With the system arranged as shown in FIG. 9, however, the wavelength range to be applied by each quarter wave plate is narrower than the whole visible range, resulting in no problem in contrast reduction on a practical basis. Even in this case, by arranging a quarter wave plate in the light path between the polarizing beam splitter and the light valve, the angular range of light obliquely incident to the polarizing beam splitter can be widened, and a projected image improved in brightness and contrast can be obtained Secure adhesion of each of the quarter wave plates 68, 69 and 70 to the corresponding one of the polarizing beam splitters 65, 66 and 67 makes further improved contrast possible. In addition, when polarizing plates are arranged between each of the polarizing beam splitters 65, 66 and 67 and the corresponding one of the dichroic mirrors 62, 63 and 46, and between each of the splitters 65, 66 and 67 and the corresponding one of the projection lenses 74, 75 and 76 and securely adhered to the corresponding one of the splitters 65, 66 and 67, the same effects as shown above can be obtained. Other than a reflection liquid crystal panel shown in these embodiments, a reflection light valve in which birefringence of, for example, an electro-optic crystal is employed can be used for this purpose.

As described above, an embodiment of a polarizing beam splitter apparatus, and a light valve image projection system using the same, of this invention have been explained in detail, but the scope of this invention is not to be limited thereby. A polarizing beam splitter apparatus of this invention is featured that the polarizing beam splitter and the quarter wave plate are used in combination, so that many modifications can be considered other than those described above. Also, a polarizing beam splitter apparatus of this invention is applicable for not only a light valve image projection system but also any system using the same.

What is claimed is:

1. A polarizing beam splitter apparatus comprising:
a polarizing beam splitter commonly usable as a polarizer and an analyzer for transmitting a first polarized component of an incident light along a first optical axis and for reflecting a second polarized component of said incident light along a second optical axis; and
a quarter wave plate;
wherein said quarter wave plate is arranged in either said first optical axis or said second optical axis along which a light travels out from and travels back again to said polarizing beam splitter in such a manner that either a fast axis or a slow axis of said quarter wave plate is perpendicular to a plane containing both said first optical axis and said second optical axis.

2. A polarizing beam splitter apparatus as claimed in claim 1, wherein said quarter wave plate is securely adhered to said polarizing beam splitter.

3. A polarizing beam splitter apparatus as claimed in claim 1, wherein a polarizing plate is arranged in an incident light path of said polarizing beam splitter as a polarizer and/or an outgoing light path of the same as an analyzer so as to pass a linearly polarized light having a predetermined direction of polarization therethrough.

4. A polarizing beam splitter apparatus as claimed in claim 1, wherein a polarizing plate is securely adhered onto an incident surface of said polarizing beam splitter as a polarizer and/or an outgoing surface of the same as an analyzer so as to pass a linearly polarized light having a predetermined direction of polarization therethrough.

5. A light valve image projection system comprising:
a light source;
a polarizing beam splitter for transmitting a first polarized component of an incident light from said light source along a first optical axis and for reflecting a second polarized component of said incident light along a second optical axis;
a reflection light valve for modulating a polarization state of an output light from said polarizing beam splitter and for reflecting the light thus modulated to said polarizing beam splitter;
a quarter wave plate; and
a projection lens;
wherein an output light from said light source is incident through said polarizing beam splitter to said light valve and an effective component contained in the light reflected from said light valve is projected through said polarizing beam splitter and said projection lens on a projection screen, and wherein said quarter wave plate is arranged in a light path between said polarizing beam splitter and said light valve in such a manner that either a fast axis or a slow axis of said quarter wave plate is perpendicular to a plane containing both said first optical axis and said second optical axis.

6. A light valve image projection system as claimed in claim 5, wherein said polarizing beam splitter and said quarter wave plate are securely adhered with each other.

7. A light valve image projection system as claimed in claim 5, wherein a polarizing plate is arranged in an incident light path of said polarizing beam splitter as a polarizer and/or an outgoing light path of the same as an analyzer so as to pass a linearly polarized light having a predetermined direction of polarization therethrough.

8. A light valve image projection system as claimed in claim 5, wherein a polarizing plate is securely adhered onto an incident surface of said polarizing beam splitter as a polarizer and/or an outgoing surface of the same as an analyzer so as to pass a linearly polarized light having a pre-determined direction of polarization therethrough.

9. A light valve image projection system as claimed in claim 5, wherein said light source comprises a metal halide lamp.

10. A light valve image projection system comprising:
a light source containing color components of three primary colors;
a color separation means for separating an output light from said light source into lights of the three primary colors;
three polarizing beam splitters each for transmitting a first polarized component of an incident light from said color separation means along a first optical axis and for reflecting a second polarized component of said incident light along a second optical axis;
three reflection light valves each for modulating a polarization state of a light and reflecting the light thus modulated;
three quarter wave plates; and
three projection lenses;
wherein each color light from said color separation means is incident through a corresponding one of said three polarizing beam splitters to a corresponding one of said three reflection light valves and an effective component contained in a light reflected from each of said three reflection light valves is projected through a corresponding one of said three polarizing beam splitters and a corresponding one of said three projection lenses on a projection screen, and wherein each of said three quarter wave plates is arranged in a light path between a corresponding one of said three polarizing beam splitters and a corresponding one of said three reflection light valves in such a manner that either a fast axis or a slow axis of each quarter wave plate is perpendicular to a plane containing both said first optical axis and said second optical axis of a corresponding one of said three polarizing beam splitters.

11. A light valve image projection system as claimed in claim 10, wherein said three polarizing beam splitters are securely adhered correspondingly to said three quarter wave plates.

12. A light valve image projection system as claimed in claim 10, wherein a polarizing plate is arranged in an incident light path of each polarizing beam splitter as a polarizer and/or an outgoing light path of the same as an analyzer so as to pass a linearly polarized light having a predetermined direction of polarization therethrough.

13. A light valve image projection system as claimed in claim 10, wherein a polarizing plate is securely adhered onto an incident surface of each polarizing beam splitter as a polarizer and/or an outgoing surface of the same as an analyzer so as to pass a linearly polarized light having a predetermined direction of polarization therethrough.

14. A light valve image projection system as claimed in claim 10, wherein said light source comprises a metal halide lamp.

* * * * *